United States Patent [19]

Estes

[11] 4,074,662
[45] Feb. 21, 1978

[54] COOLING FAN CONTROL

[76] Inventor: Kenneth K. Estes, 8248 E. Glenrosa Ave., Scottsdale, Ariz. 85251

[21] Appl. No.: 755,230

[22] Filed: Dec. 29, 1976

[51] Int. Cl.² .................... F16D 27/10; F16D 43/25; F01P 7/02
[52] U.S. Cl. ............... 123/41.12; 123/41.46; 192/82 T; 192/84 C
[58] Field of Search ............. 123/41.12, 41.46; 192/82 T, 84 C

[56] References Cited

U.S. PATENT DOCUMENTS

| | | | |
|---|---|---|---|
| 2,706,468 | 4/1955 | Willcox | 123/41.46 X |
| 3,730,151 | 5/1973 | Smith et al. | 123/41.12 |
| 3,743,068 | 7/1973 | Westervelt et al. | 192/84 C |
| 3,924,585 | 12/1975 | Woods | 123/41.12 |

Primary Examiner—Allan D. Herrmann
Attorney, Agent, or Firm—Drummond, Nelson & Ptak

[57] ABSTRACT

An electromagnetically controlled clutch is used to engage and disengage the cooling fan of a water cooled motor vehicle engine. The clutch and fan assembly in the form of an adapter kit may be attached to the existing fan mountings normally located on the water pump pulley assembly. The adapter kit includes an extender cylinder which bolts to the existing fan mountings. Bearings are provided inside this cylinder for rotationally free mounting a fan mounting hub supported on a shaft, which is free to rotate within the extender hub. An annular armature is spaced from the pulley assembly and supported around the hub by leaf springs, attached at one end to the hub and at the other end through rigid extender arms to the armature. A clutch face is provided on the water pump pulley and an electromagnet coil is fixedly mounted to the engine block in a recess in the pulley for attracting the armature under the control of a temperature operated switch, which energizes the coil when the temperature of the engine coolant exceeds a preestablished value to draw the armature into contact with a clutch face on the pulley assembly to rotate the fan.

8 Claims, 3 Drawing Figures

COOLING FAN CONTROL

BACKGROUND OF THE INVENTION

Water cooled internal combustion engines are in widespread use in motor vehicles such as automobiles and trucks. Such vehicles have a radiator which acts as a reservoir for the cooling fluid or coolant, which generally is a mixture of water and anti-freeze. A cooling fan is used to move air through the radiator for the purpose of cooling the fluid which, during operation of the vehicle, continuously circulates through the radiator. Although the operation of the cooling fan is necessary when the engine is hot, such as occurs when the vehicle is stationary or is moving at low speeds in relatively high ambient temperatures, much of the time operation of the fan is not required.

When the vehicle engine initially is started, the engine is cold and operation of the cooling fan prior to the time the engine warms up to its operating temperature clearly is not necessary. In addition, when a vehicle is operating at higher speeds, such as ordinarily are encountered in highway driving and even in most aspects of city driving, sufficient air passes through the radiator to cool it without the fan operation. This is known as ram air cooling.

With increasing concern over the efficiency of motor vehicle operation and, in addition, concern over the high cost of fuel for operating such vehicles, substantial effort is being devoted to improving the number of miles travelled for each gallon of fuel consumed. It is known that radiator cooling fans require a substantial amount of horsepower to rotate them. This is particularly true of large engine motor vehicles such as trucks which require large radiators and correspondingly large cooling fans. Several horsepower of energy are consumed in the rotation of the fans for such vehicles. Thus, if the fan is operating or being rotated by the engine when it is not necessary to effect cooling of the engine, a clear waste of engine horsepower results. In addition, when an engine is cold, it is not desirable to increase the flow of air through the radiator since this tends to lengthen the time required to heat the cooling fluid up to the desired operating temperature of the engine. Thus, it has been recognized that it is highly desirable to rotate the radiator cooling fan only when the temperature of the engine coolant is hot enough to require the operation of the cooling fan to draw air through the radiator.

In the past, some motor vehicle cooling fans have been mounted on a shaft which is an extension of the water pump shaft through a type of clutch formed by material which permits slippage between the shaft and the fan hub when the engine is cold and which provides a relatively firm engagement between the shaft and the fan hub when the engine is hot. This arrangement, however, is not particularly efficient; and even when the engine is cold, there is a considerable amount of friction between the hub and the shaft, therefore resulting in the unnecessary consumption of energy even under cold operating conditions.

Other arrangements have been made for engaging and disengaging a freely rotatable fan at different engine speeds. These arrangements, however, since they do not sense the primary condition, that is temperature of the engine coolant, upon which fan operation should be based, are unsatisfactory.

Electromagnetically operated clutches for engaging and disengaging the fan from the engine rotation have been employed in the past. Because of the location of the cooling fan; and, in addition, because of the belts and pulleys located in the forward area of the engine, the implementation of electromagnetic clutch assemblies for use with the radiator cooling fan has been difficult. Systems have been used which modify the conventional water pump cooling shaft to an extended configuration to permit mounting of an electromagnet field coil and clutch assembly on the shaft. In some cases, the field coil is mounted for rotation with the shaft which requires the use of slip rings for supplying electrical energy to the coil. Other structures employ additional bearings, binding rings, seals and the like for mounting the field coil on the shaft and then include additional apparatus to attach the field coil to a bracket which in turn is attached to the engine. The weight of the coil, however, is supported on the water pump shaft as is the weight of the fan and its hub and bearing assembly. All this additional weight creates a strain on the water pump shaft and, in the event of a water pump failure, which is relatively common in motor vehicles, disassembly of a large number of parts is required. As a consequence, the repair or replacement of the water pump, in the event of failure, is increased in cost because of the disassembly and reassembly required for the additional components used to electromagnetically operate the fan engagement and disengagement.

It is desirable to provide an electromagnetically operated clutch for engaging and disengaging the cooling fan in response to coolant temperature variations in a simple and effective manner. Ideally, this should be done with minimum modification to existing water pump/cooling fan structures in an inexpensive manner which also does not impair or complicate the removal and replacement of water pump parts in the event repair of such parts becomes necessary.

SUMMARY OF THE INVENTION

It is an object of this invention to provide an improved cooling fan assembly.

It is another object of this invention to provide an improved electromagnetically operated cooling fan assembly.

It is an additional object of this invention to provide an improved cooling fan assembly for use with the cooling fan of a fluid cooled internal combustion engine.

It is a further object of this invention to provide a temperature actuated electromagnetically operated cooling fan for a motor vehicle.

In accordance with a preferred embodiment of this invention, a cooling fan control system for use with a liquid cooled motor vehicle engine includes an extender element which is attached to the water pump drive pulley assembly for rotation with it. A cooling fan mounting hub is rotationally freely mounted by means of bearings on the extender element, so that the fan attached to the mounting hub is free of rotation from the rotation of the extender element. A clutch face is provided on the pulley assembly, and an annular armature is movably mounted to the cooling fan mounting hub by means of resilient leaf springs to permit movement of the armature in a direction parallel to the water pump shaft. Normally the springs bias the armature away from the clutch face on the pulley assembly. An electromagnet coil is fixedly mounted to the engine adjacent the drive pulley assembly, and a temperature actuated switch couples the coil with a source of electrical current. When the coil is energized, it creates a magnetic force which attracts the armature for frictional engagement with the clutch face thereby rotating the cooling fan mounting hub along with the extender element. The temperature controlled switch is selected to close only when the temperature of the engine coolant exceeds some predetermined value; so that as long as the engine coolant is below this temperature, the armature is disengaged from the clutch face and the fan is not driven.

DETAILED DESCRIPTION

Figure 1:
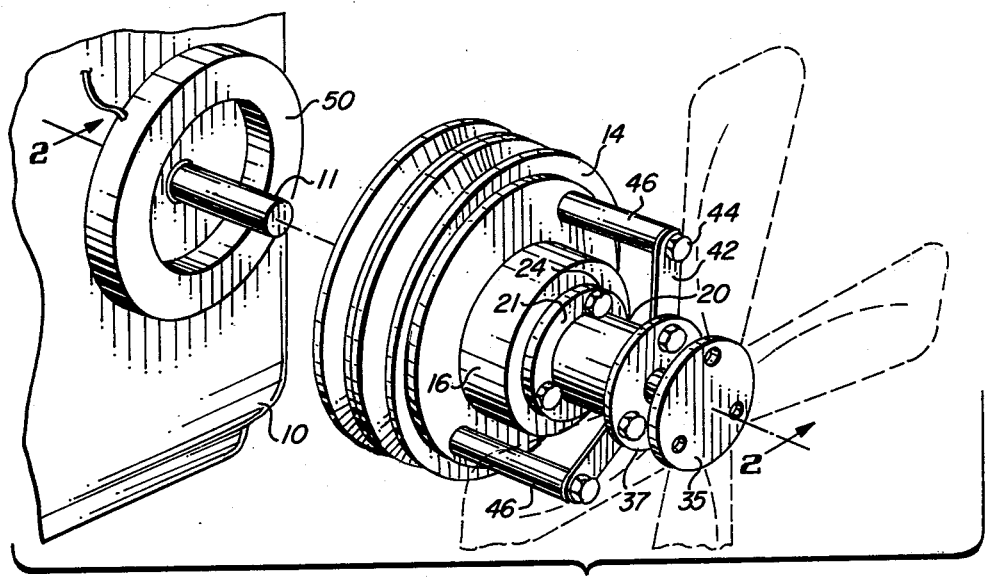
FIG. 1 is a partially exploded three-quarter view of a cooling fan control system in accordance with a preferred embodiment of the invention.

Referring now to the drawing, the same reference numbers are used in each of the three figures to designate the same or similar components. In the drawings, a typical internal combustion engine 10 is shown in a very general configuration. The particular shape, number of cylinders and type, whether gasoline or diesel, is unimportant. In such engines, a water pump is located at the forward end. Sometimes the water pump impeller is mounted in a recess for that purpose located directly in the engine block. Other engines use a separate housing for the water pump but this housing also is mounted on the forward end of the engine. The particular configuration of the water pump housing, whether it is integral with the main engine block or a separate component, is unimportant to an understanding of the cooling fan control mechanism illustrated in the drawing.

Figure 2:
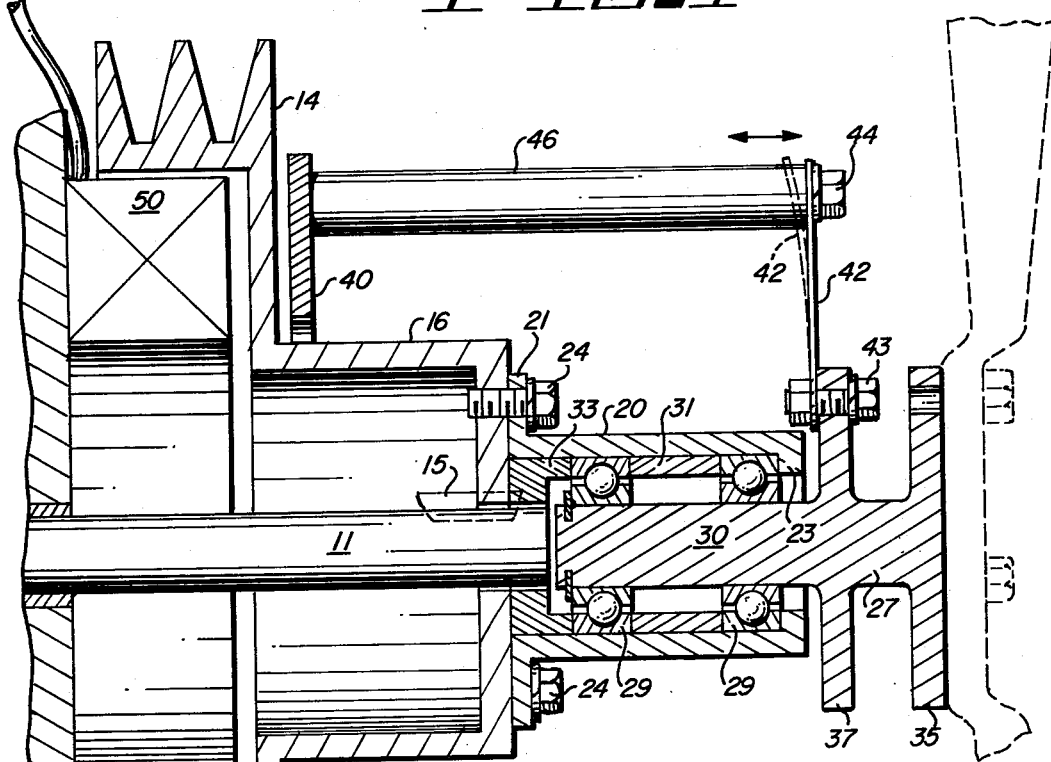
FIG. 2 is a cross-sectional view of the assembly shown in FIG. 1.

In either configuration, however, a shaft 11 extends through a fluid-tight seal out of the portion of the engine or the housing which has the water pump impeller located in it. The impeller blades are located within the pump housing on the shaft 11. A flywheel, driven by the engine, rotates continuously so long as the engine 10 operates and through conventional belts (not shown) rotates a water pump/fan pulley 14 which is fixed to the water pump shaft 11 in any suitable manner. In FIG. 2, the locking-together of the pulley 14 and the shaft 11 is illustrated as being effected by a key 15.

As most clearly shown in FIG. 2, the pulley assembly 14 includes a pulley wheel portion for engagement by the fan belt and has a hub portion 16 which extends out over the shaft 11 for connection to it. In a conventional engine, the fan (illustrated in dotted lines) is bolted directly to the forward surface of the hub portion 16; so that the fan turns continuously with the engine rotation.

In accordance with the preferred embodiment shown in the drawings, however, an electromagnetic clutch assembly for controlling the operation of the cooling fan is provided. This assembly includes an additional extender cylinder 20 which has an outwardly flared flange 21 at one end and an inwardly turned flange 23 at the other end. The flange 21 has bolt holes through it which are located to overlie the conventional fan mounting bolt holes located on the front surface of the hub portion 16 of the pulley assembly 14. Suitable bolts or fasteners 24 then are used to attach the extender 20 onto the water pump pulley assembly 14.

Prior to attachment of the extender 20 onto the face of the hub portion 16, a fan belt hub 27 is freely rotatably mounted in the housing 23 by means of a pair of spaced ball bearings 29. The outer races of the ball bearings 29 are force-fitted into the extender 20 for rotation with it. The inner races are keyed or force-fitted onto a shaft 30, which preferably is integrally formed along with the hub 27 but which could be a separate part to which the hub 27 is attached. To prevent axial movement of the shaft 30 and hub 27, a cylindrical spacer 31 is placed between the two bearings 29 and another cup-shaped cylindrical spacer 33 is located at the lefthand end of the assembly, as shown in FIG. 2. These spacers 31 and 33 are made with precision tolerances to firmly lock the assembly together when it is bolted onto the face of the hub portion 16 by means of the bolts or threaded fasteners 24. It can be seen that the spacer 33 tightly engages the front surface of the extension 16 and exerts a force toward the right, as viewed in FIG. 2, to wedge the bearings 29 and spacer 31 together against the down-turned inner edge of the flange 23 of the extender cylinder 20.

The fan, shown in dotted lines, then is bolted to the outer circular flange 35 of the hub 27 which has fan connection holes located in it corresponding to those used on the front surface of the hub portion 16 of the pulley 14. A similar set of holes are provided on an inner circular flange 37 on the hub 27. The portion of the structure described thus far permits the fan to freely rotate independently of the rotation of the pulley 14, hub portion 16 and extender 20. The outer races of the bearings 29 rotate along with the extender 20; but, except for a very minor frictional rotation imparted to the shaft 30 through the ball bearings 29, the fan hub 27 is not rotated.

To control the rotation of the fan hub 27, an annular armature 40 encircles the hub portion 16 of the pulley 14. This armature 40 is attached to the inner flange 37 of the hub 27 by means of three flexible flat leaf springs 42. One end of each of the three springs 42 shown in assembly of FIG. 1 is attached by a bolt 43 to the flange 37, and the other end is attached through an elongated bolt 44 and a rigid cylindrical spacer 46, through which the bolt 44 passes, to the armature 40. Of course, various types of fasteners could be used to interconnect these parts, such as rivets, welding, brazing, or the like; but the removable fasteners which are illustrated in FIGS. 1 and 2 are considered preferable since they facilitate repair of the various parts in the event of subsequent failure.

The springs 42 normally bias the assembly and the armature 40 to the position shown in solid lines in FIG. 2. In this position, the springs 42 urge the armature 40 toward the right, as viewed in FIG. 2, away from the face of the pulley 14. The face of the pulley 14 which is immediately adjacent the armature 40 is a clutch face and may be provided with suitable material for frictionally engaging a corresponding surface on the face of the armature 40.

For engaging the fan so that it turns with the pulley 14, an electromagnet coil 50 is rigidly attached to the engine block or to the water pump housing. The coil 50 is located within a recess on the pulley 14, as seen most clearly in FIG. 2. In addition, the pulley 14 is made of non-ferrous material while the armature 40 is made of ferrous material. Whenever the coil 50 is not energized, the armature 40 does not come in contact with the clutch face of the pulley 14 and the fan does not rotate. When the coil 50 is energized, however, it creates a magnetic field which attracts the armature 40 toward the left, as viewed in FIG. 2, to firmly hold the armature 40 against the clutch face of the pulley 14. So long as the coil 50 remains energized, the armature 40 rotates with the pulley 14 and imparts rotational energy through the fasteners 44, spacers 46 and springs 42 to the inner flange 37 of the hub 27 to rotate the fan along with the rest of the assembly shown in the drawings.

Figure 3:
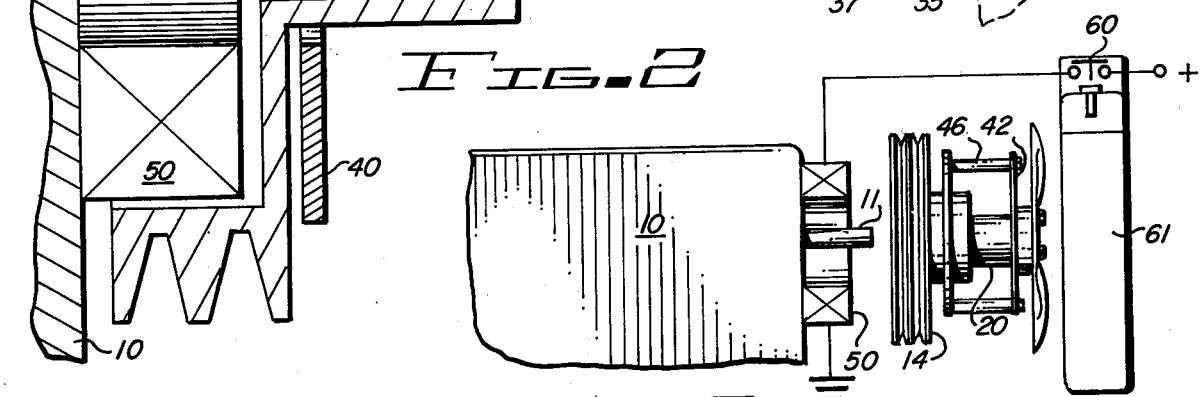
FIG. 3 is a partially diagrammatic representation of the cooling fan assembly shown in FIGS. 1 and 2 and the control circuit for operating the assembly.

Reference now should be made to FIG. 3 which shows the manner in which the current flow to the armature 50 is controlled. FIG. 3 is a partially exploded diagrammatic view of the assembly shown in FIGS. 1 and 2. In FIG. 3, the pulley 14 and the rest of the cooling fan control apparatus has been moved to the right of its normal position to expose the electromagnet coil 50. The assembly comprising the pulley 14, extender 20, and the rest of the elements shown in FIG. 2 normally is mounted on the water pump shaft 11 overlying and covering the coil 50, as shown in FIG. 2.

Current flow through the coil 50 is effected through a circuit extending from ground to the positive 12 volt DC supply available in the motor vehicle through a temperature-controlled switch 60. The switch 60 may be of any suitable type, such as a conventional temperature responsive solenoid or the like, which closes its contacts upon sensing when the coolant rises to a preestablished value. When the engine is cold or when ram air cooling is sufficient to maintain the temperature of the coolant in the radiator 61 of the vehicle below this preestablished value, the switch 60 is open. The electromagnet coil 50 then is not energized, and the armature 40 does not engage the clutch face of the pulley 14. When this condition exists, the fan shaft 30 is freely rotatable by means of the bearings 29, and does not rotate with the extender element 20.

Once the water temperature becomes sufficiently hot, however, to close the switch 60, the electromagnet coil 50 is energized. As stated above, when this occurs, the armature 40 is pulled into engagement with the clutch face on the pulley 14 and rotates with the pulley 14. This rotational energy is imparted through the extenders 46 and bolts 44 to the springs 42 to rotate the hub 27 and the fan with the pulley 14.

Various configurations of the clutch faces on the pulley 14 and the armature 40 may be used. Generally a plurality of annular slots are formed in these elements to aid in dissipating heat generated by the initial friction contact between the two when the electromagnet coil 50 first is energized.

Once the engine has cooled down to a temperature which is below the one causing the switch 60 to be closed, the switch 60 once again opens, de-energizing the coil 50. Under this condition of operation, the fan no longer rotates with the engine and no unnecessary horsepower is dissipated in driving the fan. As a consequence, the efficiency of the operation of the motor vehicle is improved, particularly in the case of large trucks.

It can be seen from the foregoing description that the cooling fan is operated only when it is necessary to perform its intended function, that is, of cooling the fluid in the radiator 61. During the initial starting and warm-up period of the engine, prior to the coolant attaining its operating temperature, the fan does not operate. Neither does the fan operate when the vehicle is being driven on the highway since the ram air passing through the radiator under these conditions normally is sufficient to maintain the temperature of the coolant in the radiator below the temperature which causes the switch 60 to close.

One of the primary advantages of the assembly which has been described and which is shown in the drawing is that it may be attached to the same mounting holes normally used to mount the fan in a conventional manner. A minimum number of parts are required and installation is simple. Removal of this assembly is no more difficult than the removal of the fan from a conventional engine. Thus, if repairs to the water pump are necessary, these repairs are not complicated because of the addition of the clutch controlled fan assembly which has been described. In addition, the parts which have been added are relatively lightweight and no significant wear-inducing load is imparted to the water pump shaft and the bearings in which it rotates. The particular spring configuration and the number of springs and interconnecting spacers may be varied in accordance with the particular operating conditions which are encountered and in accordance with the structure of the particular vehicle with which the assembly is used. Finally, the assembly is readily adaptable for installation as a kit to modify existing vehicles.

I claim:

1. For use with a liquid cooled motor vehicle engine having a water pump with a shaft connected to a water pump drive pulley assembly, a cooling fan control system including in combination:
   an extender element attached to the water pump drive pulley assembly for rotation therewith;
   a cooling fan mounting hub;
   bearing means for rotationally free mounting said fan mounting hub on said extender element;
   clutch face means carried by the pulley assembly;
   an armature movable mounted to said fan mounting hub by resilient biasing means for permitting movement of said armature in a direction parallel to the water pump shaft, said biasing means urging said armature away from said clutch face means;
   an electromagnet coil fixedly mounted to the engine adjacent the water pump drive pulley assembly;
   switching means coupling said coil with a source of electrical current for energizing said coil to create a magnetic force to attract said armature for frictional engagement with said clutch face means, thereby rotating said cooling fan mounting hub with said extender element.

2. The combination according to claim 1 wherein said electromagnet coil comprises an annular concentrically mounted about the axis of the water pump shaft.

3. The combination according to claim 1 wherein said extender element is of a hollow cylindrical shape having a flange at one end connected to the water pump drive pulley assembly, said cooling fan mounting hub has a shaft extending therefrom into said extender element, and said bearing means rotationally mounts the shaft of said mounting hub inside said extender element.

4. The combination according to claim 3 wherein said bearing means includes first and second longitudinally spaced bearings located at substantially opposite ends of said extender element.

5. The combination according to claim 1 wherein said armature is concentrically mounted around the axis of said drive pulley assembly adjacent said clutch face means by said armature mounting means which includes resilient leaf springs, each connected at one end to said fan mounting hub and connected at the other end through rigid spacers to said armature.

6. The combination according to claim 5 wherein said armature is in the shape of an annular ring, the center of which is at the axis of the water pump shaft, and said leaf springs are located equiangularly about the axis of the water pump shaft for interconnecting said cooling fan hub with said armature through rigid spacers.

7. The combination according to claim 1 wherein said switch means comprises a thermally activated switch responsive to the temperature of the coolant in the engine and closed to energize said electromagnet coil when the temperature of the coolant exceeds a predetermined temperature.

8. A kit for modifying the cooling fan operation of a liquid cooled motor vehicle engine having a water pump with a shaft connected to a water pump drive pulley assembly including in combination:

an extender element for attachment to the water pump drive pulley assembly for concentric rotation therewith;

a cooling fan mounting hub;

bearings means for rotationally free mounting said fan mounting hub on said extender element;

an armature movably mounted to said fan mounting hub by resilient biasing means for permitting movement of said armature in a direction parallel to the water pump shaft, said biasing means urging said armature away from the drive pulley assembly;

an electromagnet coil fixedly mounted to the engine adjacent the water pump drive pulley assembly;

switching means coupling said coil with a source of electrical current for energizing said coil to create a magnetic force to attract said armature for frictional engagement with the drive pulley assembly, thereby rotating said cooling fan mounting hub with said extender element.

* * * * *

UNITED STATES PATENT AND TRADEMARK OFFICE
CERTIFICATE OF CORRECTION

PATENT NO. : 4,074,662
DATED : February 21, 1978
INVENTOR(S) : Kenneth K. Estes

It is certified that error appears in the above-identified patent and that said Letters Patent are hereby corrected as shown below:

Claim 1, Column 6, Line 38:
"movable" should be --movably--;

Claim 2, Column 6, Line 52:
Insert the word --coil-- after "annular".

Signed and Sealed this

Sixth Day of June 1978

[SEAL]

Attest:

RUTH C. MASON
Attesting Officer

DONALD W. BANNER
Commissioner of Patents and Trademarks